June 5, 1956  F. MAUD  2,749,109
HEATING APPARATUS
Filed July 24, 1952  3 Sheets-Sheet 1

INVENTOR.
FRED MAUD
BY E. Wellford Mason
ATTORNEY.

June 5, 1956
F. MAUD
2,749,109
HEATING APPARATUS
Filed July 24, 1952
3 Sheets-Sheet 2
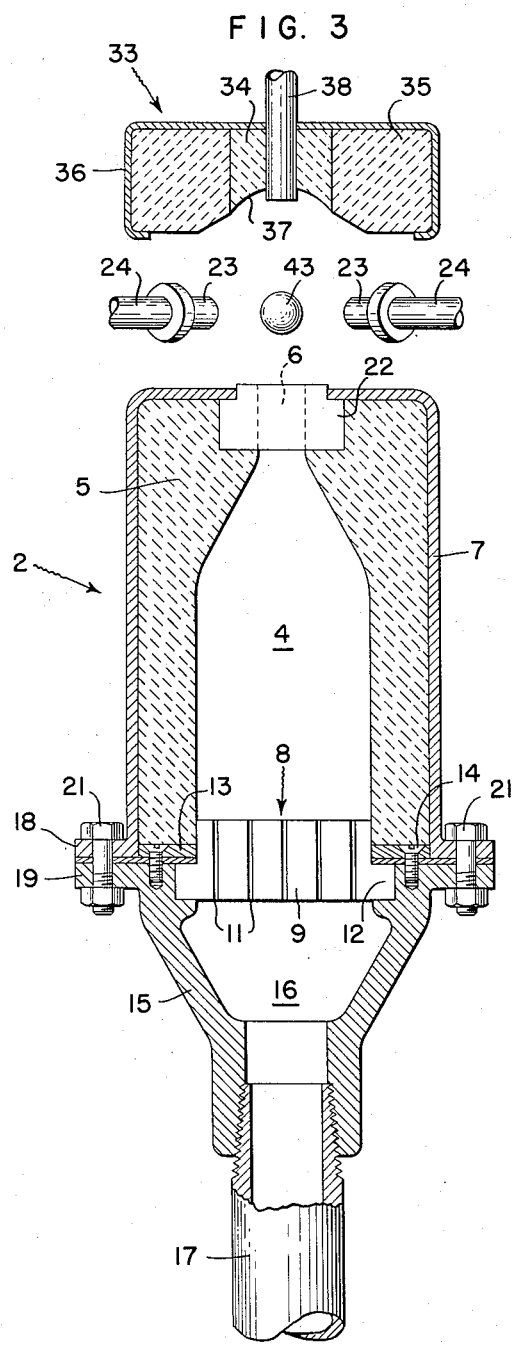
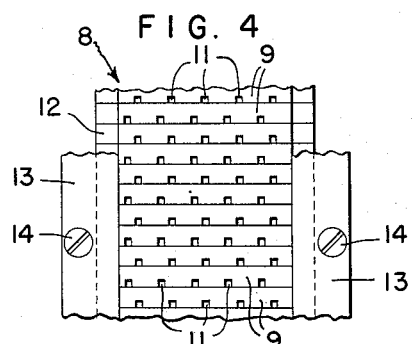
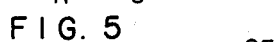
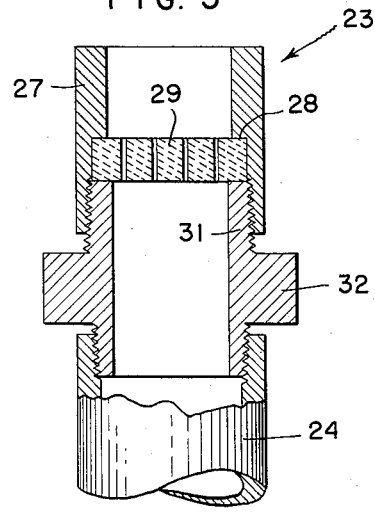
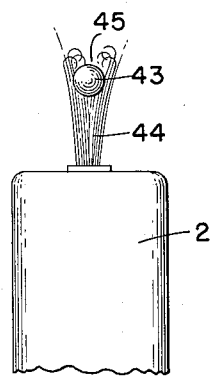
INVENTOR.
FRED MAUD
BY *E. Wellford Mason*
ATTORNEY.

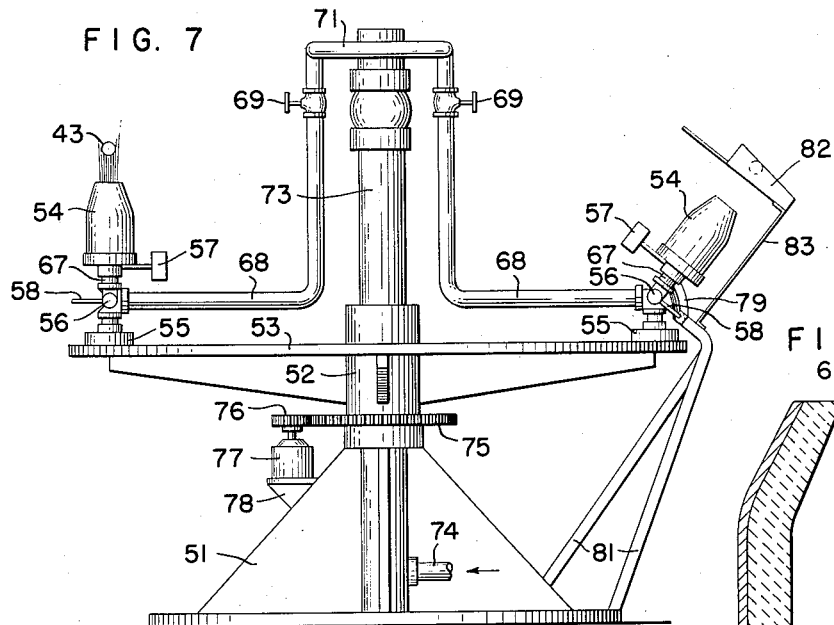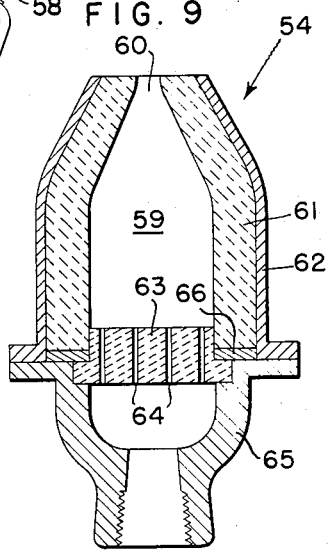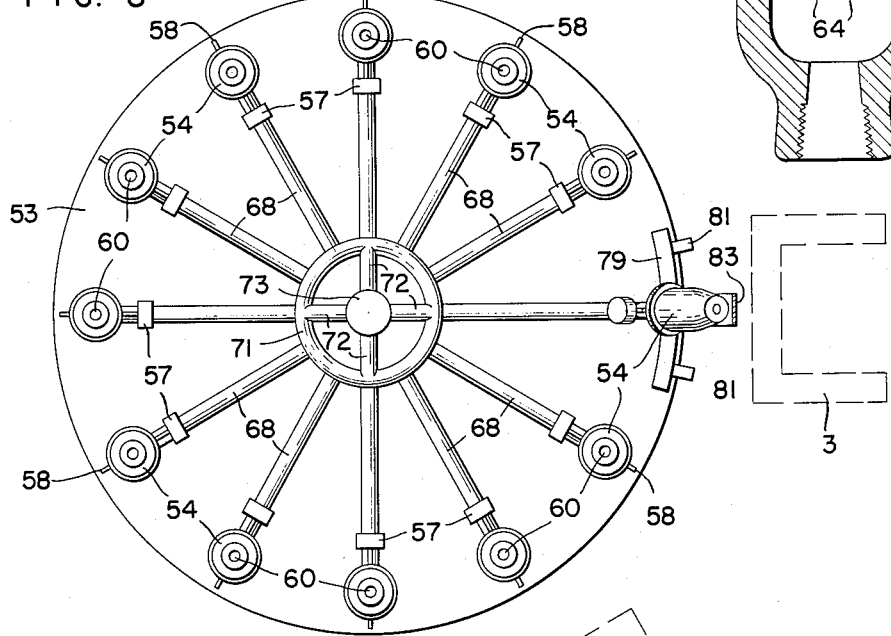

United States Patent Office 2,749,109
Patented June 5, 1956

2,749,109

HEATING APPARATUS

Fred Maud, Philadelphia, Pa., assignor to Selas Corporation of America, Philadelphia, Pa., a corporation of Pennsylvania Application July 24, 1952, Serial No. 300,661

14 Claims. (Cl. 263—6)

The present invention relates to heat treating machines, and more particularly to apparatus for heating spherical objects such as metal balls and glass marbles to an elevated temperature.

In some industrial operations, it is the custom to form material in the shape of spheres, and then to heat the spheres to perform a hot forming operation on them. An example of such a procedure is in the glass industry where spheres or marbles of glass are made in a marbling machine. The marbles are later heated and shaped in a hot forming machine into lens blanks, ash trays, etc. Similar heating is used from time to time on steel balls, especially for hardening them.

It is an object of the present invention to provide apparatus for heating small spherical objects. It is a further object of the invention to provide a heat treating machine which receives a spherical object at one point, moves it through a path and delivers it at another point, and heats the object to a desired hot forming temperature while it is being moved from the first to the second point.

It is a further and more specific object of the invention to provide apparatus for heating spherical objects on a blast or jet of hot products of combustion.

In following the invention, a fuel mixture of gas and air is burned in a confined space and the products of combustion are discharged through a restricted outlet at a high temperature and a high velocity. The spherical objects to be heated are supported by and moved through a path by the hot gases. The spheres are heated by the gases while they are being supported by them.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Figure 3 is a section view taken on line 3—3 of Figure 1;

Figure 4 is a fragmentary view of a portion of the bottom of the heating apparatus;

Figure 5 is a section view of the pusher burner;

Figure 6 is a view showing how the spheres are supported on the stream of hot gas;

Figure 7 is a side view of another form of the apparatus;

Figure 8 is a top view of Figure 7; and

Figure 9 is a section view of one of the burners used on the apparatus of Figure 7.

Figure 1:
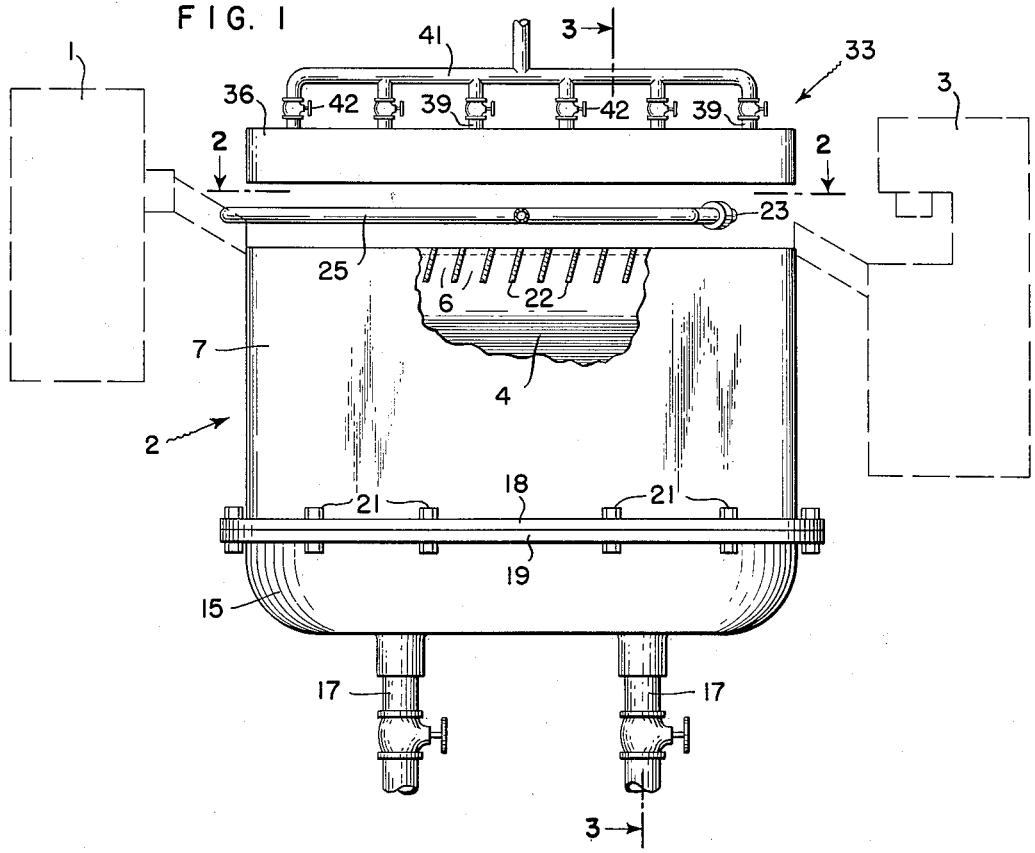
Figure 1 is a view partly in section showing the heating apparatus.
Figure 2:
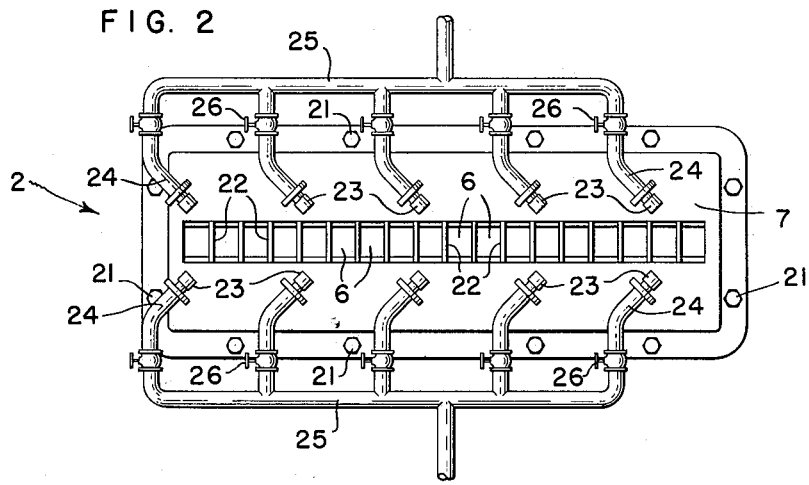
Figure 2 is a top view of the portion of the heating apparatus taken on line 2—2 of Figure 1.

Referring to Figure 1 of the drawing, there is shown diagrammatically at 1 a machine for making or supplying the spheres that are to be heated. These spheres are supplied either manually or automatically to the heating apparatus 2 where they are heated to the desired temperature. From this mechanism, the heated spheres are transferred either manually or automatically to a machine 3 that is used to perform further work on the heated spheres.

The heating apparatus 2 includes means forming a combustion chamber 4 in which a mixture of gas and air is heated to be discharged at high temperature and velocity. This chamber is formed inside a structure including refractory ceramic side walls 5 in the shape of a substantially rectangular chamber the upper end of which is narrowed to form an elongated, restricted outlet 6 through which the products of combustion are exhausted at high velocity. The walls 5 are encased and protected by a metal shell 7. The bottom 8 of the combustion chamber takes the form of a screen that is composed of a plurality of flat ceramic plates 9 each of which is provided on one face thereof with a number of parallel grooves. It will be seen from Figure 4 that when the plates are stacked up with the flat face of one against the grooved face of the next, the grooves 11 form a series of apertures through which a fuel mixture may be supplied to the combustion chamber. These plates are held in place by shoulders 12 extending outwardly from the sides thereof, which shoulders are held by metal strips 13 against a suitably formed ledge on a base casting 15. The strips 13 are attached to the casting by means of screws 14. If desired, a gasket can be used between the plates 13 and the casting 15 in order to insure a gas tight connection between these two parts. The casting 15 is so designed that below the floor 8 of the combustion chamber there is a chamber 16 which forms a manifold in communication with the lower ends of each of the apertures in the floor. Fuel is supplied to the chamber through one or more inlet pipes 17, at a rate determined by the adjustment of a valve therein.

The upper wall 5 of the combustion chamber is fastened in position on the casting 15, as best shown in Figure 3, by means of a flange 18 extending horizontally outward from the metal shell 7 and a flange 19 extending outwardly from the casting 15. Bolts 21 hold these two flanges together. If desired, the above mentioned gasket may extend outwardly between the flanges in order to insure a tight joint between the various parts.

In operating this portion of the apparatus, a supply of a combustible mixture of fuel and air is forced into the chamber 16. The mixture flows through the apertures formed by the grooves 11 and is burned in the combustion chamber 4. Fuel burning in this chamber heats the interior to incandescence to thereby increase the rate of combustion and the expansion of the gases of combustion. These gases are discharged at a temperature substantially equal to the temperature within the chamber, and at a high velocity through the elongated and restricted outlet 6. It is noted that there are provided a plurality of ceramic inserts 22 across the outlet 6. By referring to Figure 1, it will be seen that these inserts are set at a slight angle to the vertical in order to give a horizontal component to the exhaust gases.

Slightly above and on each side of the outlet 6 there are provided a plurality of burners 23 which serve to propel the object being heated along the discharge gases in a manner to be described below. Each of these burners is connected by a pipe 24 with a suitable manifold 25 through which fuel is supplied. The supply of fuel to each burner is regulated by a valve 26. Burners 23 may be of any standard type in which the products of combustion are discharged in an axial direction. One such burner is shown by way of example in Figure 5 of the drawing. In this figure, it will be seen that there is provided a sleeve 27 having a shoulder 28 formed on the interior thereof. This shoulder is used to locate a burner screen 29 that may take the form of a thin ceramic disc which is provided with a plurality of axially extending openings. The screen 29 is held in place against the shoulder 28 by a cylindrical member 31 that is threaded into the end of the sleeve 27. Member 31 is provided with an enlargement 32 taking the form of a hexagon so that it can be placed in the supply pipe 24 by means of a suitable wrench.

Additional heat may be provided by a radiant roof that is placed directly above the restricted opening 6 of the heating apparatus 2. This roof includes therein a number of ceramic burners 34 that are located directly above the slot. On each side of these burners, are refractory members 35 which, along with the burners, are held in position to form the radiant roof by sheet metal 36. The burners are similar to those shown in Hess patent, 2,215,079, granted on September 17, 1940. Each of these burners takes the form of a ceramic block having a cup-shaped depression in its face into the base of which extends a distributor member 38. A combustible mixture of gas and air is supplied through the distributor to be burned along the surface of the cup to heat it to incandescence. The distributors 38 of the various burners are connected by pipes 39 with a manifold 41. The supply of fuel to each burner may be adjusted individually by a valve 42.

In the operation of the apparatus, a supply of gas and air under suitable pressure is introduced into the chamber 4 where it is burned. The process of combustion causes expansion of the gases so that the hot products of combustion are discharged from this chamber at a high temperature and velocity in an elongated vertical jet having a component directed generally from the machine 1 toward the machine 2. The sphere to be heated is placed in the stream of gases flowing through the outlet 6 near the left end thereof in Figure 1. This stream is of sufficient width and velocity to support the sphere in mid-air. The sphere would normally stay in one position in the stream of gases, but since the gases have a direction toward the right in the drawing, the sphere will have a tendency to move in that direction while it is supported by the gases. This tendency of the sphere to move toward the right in Figure 1 along the jet of gases is aided by the action of the gases being discharged from the burners 23. It will be noted that the burners 23 are placed opposite each other. They will be so adjusted that the gases discharged from opposite ones of these burners will have substantially the same velocity so that the sphere is moved along the gases coming from outlet 6 rather than being blown off the side thereof. The sphere will continue along the length of the apparatus 2 floating on the exhaust gases until it moves to the right of that apparatus in Figure 1, at which time it can be removed manually or fall into a trough which will convey it to the apparatus 3 that performs further work thereon. The speed of heating is increased by the radiant roof located above apparatus 2.

Apparently, the velocity of the exhaust gases 44 flowing around the sphere 43 create a low pressure area 45 around the top thereof as shown in Figure 6 of the drawing. In any event, the sphere is actually suspended in the gases and moved from one end to the other thereof. During the operation of the machine, there can be a number of the spheres suspended in the gas stream to be heated at the same time. It is only necessary that the spheres be kept far enough apart so that they do not interfere with the flow of gases around the next adjacent sphere. It is noted that the spheres will be rotated as they are moving along the jet of gases. The rotation is probably due to the fact that the center of gravity of the spheres may be slightly displaced from the geometrical center thereof. In any event, this rotation increases the speed of heating of the spheres as well as the uniformity in the heating thereof.

The burner shown in Figure 1 is positioned with the slot extending in a horizontal direction, and the objects being heated are moved along the slot by the exhaust of the pusher flames 23. If desired, the burner could be set at an angle to the horizontal so that the balls are running down hill along the stream of gases. Pusher burners will be needed in this case also, but the force required to move the objects along the gas path will not be as great as that required when the apparatus is horizontal.

There is shown in Figures 7 to 9 inclusive a different embodiment of the apparatus. In this case, each of the spherical objects is placed upon the exhaust stream from a small burner, so that the objects are heated individually while the burner is moved through a path taking the objects from the point of supply to the point of discharge.

Referring to the drawings, it will be seen that there is provided a base 51 upon which there is mounted for rotation a support 52 for a circular plate or dial 53. Located at spaced points around the periphery of this dial are burners 54. Each of these burners is positioned on the dial by means of a fixture 55 and a swinging joint 56 which will permit the burner to move from the position shown at the left of Figure 7 to that at the right thereof. The burners are normally held in their vertical position by means of a weight 57, but they can be moved out of the vertical position by means of an arm 58 which is attached thereto and extending radially outward.

Each of the burners is smaller than the large apparatus 2 of Figure 1, but is generally similar in design. The burners (Figure 9) are provided with a combustion chamber 59 having a restricted and preferably circular outlet 60. The walls of the combustion chamber are formed of refractory material 61 that is protected by a metal shell 62. The bottom of the combustion chamber is formed of a ceramic screen 63 having openings 64 through which the combustible mixture of gas and air is supplied. This screen is held in position against a suitable shoulder formed on the base casting 65 by a holding ring 66. Shell 62 and casting 65 are provided with flanges by means of which these parts are fastened together.

Fuel is supplied to the burner through a pipe 67 upon which it is mounted on one arm of the joint 56. The other arm of the joint 56 is supplied by a pipe 68 having a valve 69 therein. All of the pipes leading into the various burners are connected with a circular manifold 71 that is supported by pipes 72 extending from a centrally located and upstanding pipe 73. The arrangement is such that the fuel mixture is introduced through an inlet 74 at the base 51 and passes up through the center of the dial through the pipe 73. A suitable rotary joint of any well known type is provided in the apparatus to permit rotation of the dial without leakage of the fuel. The dial and the parts carried thereby are rotated by a gear 75 which is driven from a pinion 76 on the shaft of a motor 77. This motor is mounted on a support 78 attached to the support 51.

In the operation of the machine, a spherical object 43 is moved from the machine 1 and placed upon the blast of gases issuing from a burner 54. The object will be supported on this blast while the dial is being rotated in a clockwise direction in Figure 8, for example, to move the burner from a position in front of the apparatus 1 to a position in front of the apparatus 3 where the sphere is removed. Means is provided to tilt each burner as it approaches its discharge position, to thereby discharge automatically the ball from the burner. To this end, there is provided an arc shaped cam 79 having a generally U-shaped section and having a low portion therein. The cam is mounted on a support 81 fastened to base 51 and extending around the edge of the dial. As the dial rotates, the arms 58 are received by the slot of the cam to cause the burners to be tilted to the position shown at the right of Figure 7 of the drawing. It has been found that even when the burners are tilted to an angle of substantially 45° from the vertical, the blast of gases will still retain the sphere in position. Therefore, an interceptor shield 82 is provided to strip the sphere from the blast. This shield is so located that it will extend between the sphere and the burner as the burner is tilted so that the supporting effects of the blast on the sphere is discontinued. The sphere will then roll down the shield to the apparatus 3. It is noted that this shield is mounted on a support 83 which is in turn attached to the support 81.

Machines of this type are useful in many different industries. For example, ball bearings can be heated by these machines for hardening or other purposes. Since the sphere is completely enclosed in an envelope of products of combustion, scaling will be negligible. Further, there is no physical contact with the sphere that will tend to deform it in even the slightest degree. Another use of the apparatus, for example, is in the heating of glass marbles prior to the time they are molded or dropped into a machine for some molding operation such as the making of lens blanks or coasters.

A steel ball bearing ⅜ of an inch in diameter can be heated to 1600° F. in six seconds. In performing this heating operation, gases at approximately 3000° F. will exhaust from the burner opening at a velocity of between 800 and 1000 feet per second. The gas stream of this velocity will support the ball approximately ¾ inch above the burner. Actually, the ball is very stable while it is being heated. The size of the burner exhaust opening relative to that of the object being heated is not critical, it being only necessary that the stream of gas be large enough to envelope the object. The larger the opening, however, the more fuel that will be required, so it is advantageous to have the stream of gas as small as possible and still support the sphere. A sphere of ¾ inch diameter can be supported on a blast of gas ⅜ inch in diameter. The blast will spread enough to support the sphere a slight distance above it. For a blast of gas at a given velocity, the sphere will assume a position of equilibrium a distance above the exit of the discharge orifice that will vary with the weight of the sphere. The velocity of the gas stream can be varied by varying the pressure of the fuel supply. Normal fluctuations in the pressure of the fuel being supplied to the burner will cause slight changes in the velocity of the exhaust gases. This will cause the sphere to bounce a little on the gases, but does not seem to set up oscillations which will cause the sphere to be thrown off.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention as set forth in the appended claims, and that in some cases certain features of my invention may be used to advantage without a corresponding use of other features.

What is claimed is:

1. The method of heating a spherical object which comprises producing a vertically directed high temperature, blast of gases of a velocity sufficient to support the object at a given level, the blast being of a size to completely envelope the object, placing the object in the blast to be supported thereby at said given level and moving the object while it is supported at said level by the blast from a point of supply to a discharge point, the object being heated by the gases as it is being moved between said two points.

2. The method of heating a spherical object which comprises burning a combustible mixture of fuel and air in a substantially closed combustion space having a restricted outlet, exhausting the hot products of combustion through the outlet as a high temperature, high velocity stream of gas in a substantially vertical direction, placing the object to be heated in said stream of gas by which it is supported, regulating the pressure of the fuel and air supplied to the combustion space to thereby vary the velocity of the stream of gas and the level at which the object is supported therein, and moving the object from a supply point to a discharge point while it is at said level in said stream of gas.

3. The method of claim 2 in which the stream of gas is produced in the form of an elongated sheet of a width sufficient to envelope the object, and in which the supply point is adjacent to one end of the sheet and the discharge point is adjacent to the opposite end of the sheet, and in which movement of the object from the supply point to the discharge point is produced by projecting a jet of gas against the object in a direction to move the object along said sheet from one end to the other thereof.

4. The method of claim 2 in which the stream of gas is circular in section and of a size to envelope the object, and in which the object is moved from the supply point to the discharge point by moving the stream of gas.

5. In apparatus for heating spherical objects, the combination of structure forming a combustion chamber having an inlet and a restricted outlet, means to supply a combustible mixture of fuel and air to said inlet to be burned in said chamber, the products of combustion being discharged through said outlet as a high temperature, high velocity jet, means to mount said structure so that the jet is discharged in a substantially vertical direction, the object to be heated being supported at a predetermined level by and heated by said jet, and means to move the object through a substantially horizontal path from a loading station to an unloading station while it is supported by said jet.

6. Apparatus for heating spherical objects comprising in combination burner means being provided with a combustion chamber having an elongated restricted outlet extending in a substantially horizontal plane, means to supply fuel and air to said chamber to be burned therein, the products of combustion being discharged through said outlet in a vertical stream, a plurality of burners operative to discharge a jet of gases, means to mount said burners in a substantially horizontal plane above and on opposite sides of said outlet, said burners being directed obliquely to said slot and toward one end thereof, the jets from said burners serving to move an object supported in said stream of products of combustion toward said one end.

7. The combination of claim 6 including a hood located above said restricted outlet, and means to heat said hood to incandescence to thereby direct radiant heat toward said outlet.

8. The combination of claim 7 including a plurality of deflecting members located in said burner means across the outlet thereof, said members being tilted to direct the stream of gases obliquely toward said one end thereof.

9. Apparatus for heating spherical objects comprising a burner having a closed combustion chamber provided with an elongated restricted outlet extending in a substantially vertical direction, means to supply fuel and air to said chamber to burn therein and produce a stream of hot gases of combustion flowing from said outlet, the object to be heated being supported by said stream, a plurality of burners each adapted to produce a jet of gases located on each side of said outlet and above the same, means to mount said last mentioned burners so the jets therefrom are directed in a plane at right angles to said stream of gases and diagonally toward the same, the jets from burners on opposite sides of said stream converging at the center thereof, and means to regulate the supply of fuel to each of said burners.

10. In apparatus for heating a spherical object, the combination of structure forming a combustion chamber having an inlet and a narrow elongated outlet extending in a substantially horizontal plane, means to supply a combustible mixture of fuel and air through said inlet, the fuel being burned in said chamber with the products of combustion being discharged as a sheet through said outlet, the object to be heated being supported on said sheet, and means to move said object along said sheet comprising a plurality of burners each adapted to produce a jet of hot products of combustion, means to mount said burners in pairs with one of each pair on opposite sides of said outlet, the burners being directed diagonally to said outlet and substantially perpendicular to said sheet whereby the jets produced by the burners of each pair will converge above the outlet, the jets from said burners serving to move the object along said sheet from one end to the other thereof.

11. In apparatus for heating spherical objects, the combination of a support, means to mount said support for rotation around a vertical axis, a plurality of burners operative to discharge a high velocity, high temperature jet of products of combustion, means to mount said burners at spaced points adjacent to the periphery of said support for movement from a normal vertical position to a position at an angle thereto, means to supply a combustible mixture of fuel and air to said burners at any position thereof, the objects to be heated being placed in said jets and supported thereby as said support is rotated, means to tilt said burners from the vertical position at one location thereof as said support is rotated, and a stripping device operative to extend between a burner and an object supported on the jet discharged therefrom in the location in which said jet is tilted.

12. In apparatus for heating a spherical object, the combination of a support, means to mount said support for rotation around a vertical axis, a plurality of burners of a type operative to discharge a high temperature, high velocity jet of products of combustion, means to mount said burners at spaced points on said support in a position that the jets are discharged in a substantially vertical direction, means to supply a combustible mixture of fuel and air to said burners at any position of said support, the objects to be heated being supported in said jet of products of combustion, and means to rotate said support to carry each burner through a circular path including a loading station and an unloading station.

13. The combination of claim 12 including means to tilt each burner radially outward from its vertical position as the burner is moved through said unloading station.

14. The combination of claim 13 including a stripping device, and means to mount said device in a location to extend between said burners and the object supported on the jet discharged therefrom as said burners are tilted.

References Cited in the file of this patent

UNITED STATES PATENTS

| | | |
|---|---|---|
| 2,215,079 | Hess | Sept. 17, 1940 |
| 2,462,366 | Davis et al. | Feb. 22, 1949 |
| 2,468,816 | Duce | May 3, 1949 |
| 2,619,776 | Potters | Dec. 2, 1952 |

FOREIGN PATENTS

| | | |
|---|---|---|
| 690,213 | France | Sept. 17, 1930 |
| 663,121 | Great Britain | Dec. 19, 1951 |